Nov. 18, 1969  D. J. PHILIPPS ET AL  3,478,587
CAPACITANCE-TYPE FLUID MEASURING APPARATUS
Filed Nov. 15, 1967
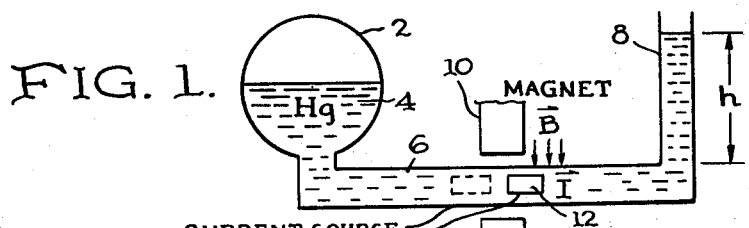
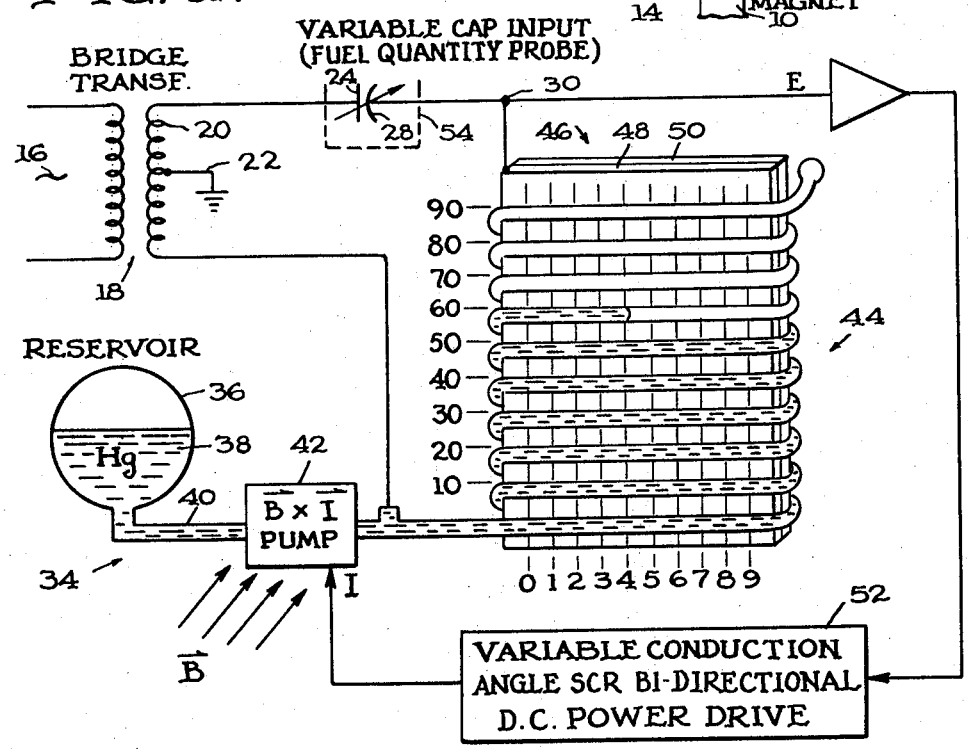
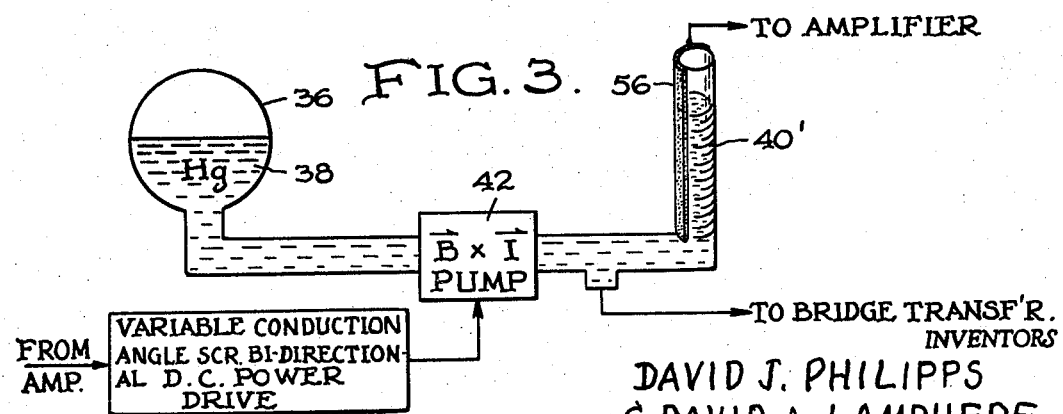
INVENTORS
DAVID J. PHILIPPS
& DAVID A. LAMPHERE
BY Edwin E. Greigg
ATTORNEY United States Patent Office 3,478,587
Patented Nov. 18, 1969

3,478,587
CAPACITANCE-TYPE FLUID MEASURING APPARATUS
David J. Philipps, Middlebury, and David A. Lamphere, Milton, Vt., assignors to Simmonds Precision Products, Inc., Tarrytown, N.Y., a corporation of New York
Filed Nov. 15, 1967, Ser. No. 683,336
Int. Cl. G01f 23/26
U.S. Cl. 73—304                                                     1 Claim

ABSTRACT OF THE DISCLOSURE

A capacitance liquid contents gauge employing a bridge circuit which compares a reference signal with the measuring signal, the resultant signal being fed to a bridge amplifier. The rebalancing capacitor has a movable conductive liquid electrode and a fixed electrode with a magletic pump responsive to the output of the amplifier for moving the liquid electrode to restore the bridge to balance.

---

This invention relates to liquid content gauges of the kind in which measuring of the mass of liquid is effected in terms of the capacity of a condenser which is arranged in the container for the liquid in such manner as to be immersed in the liquid to an extent dependent on the volume present.

In conventional rebalancing bridge-type capacitance gauges, a measuring condenser is connected in one arm and a reference condenser is connected in an opposing arm of a bridge circuit in which a pair of voltage sources constitute the other two arms. A phase sensitive detector-amplifier responsive to the bridge output is coupled through a rebalancing motor to vary the voltage applied to the reference condenser thereby maintaining bridge balance.

In a gauge of the above type, the rebalancing motor with its indicating means and rebalancing potentiometer normally associated therewith involves a number of moving parts which together detract from simplicity of design as well as from freedom of failure. It is the purpose of this invention to overcome these difficulties encountered with the rebalancing portion of a capacitance-type rebalancing bridge gauging system. The invention makes use of a well-known principle of magneto-hydrodynamics for providing a readout device having no moving mechanical parts which quantitatively displays an analog signal while restoring the bridge circuit to a null condition.

Accordingly, it is one object of this invention to provide an analog readout indicating system for visually displaying a parameter being measured in a capacitive feedback loop of a rebalancing bridge capacitance gauging system.

It is another object of this invention to provide a closed loop capacitive system for a rebalancing bridge capacitance gauging system in which there are no moving mechanical parts.

It is a further object of this invention to provide a closed loop capacitive system operating as a rebalancing and indicating means for use with liquid quantity gauging systems in aircraft which is independent of attitude, acceleration and temperature.

In accordance with one embodiment utilizing the principles of this invention, there is provided a conventional rebalancing measuring bridge circuit employing a measuring capacitor device arranged with its electrodes vertically in a fuel tank of an aircraft. The level of the fuel between the capacitor electrodes depends upon the fuel level in the fuel tank and the capacitor is designed so that its capacitance is a function of the dielectric constant of the material between its spaced electrodes. Accordingly, its capacitance will change with a change of fuel level. A bridge circuit network is provided to compare a reference signal with the measuring signal furnished by the measuring capacitor wherein a resultant signal proportional to the difference of the two is amplified and caused to vary a rebalancing capacitance between a conducting liquid column in a glass indicating tube and an electrode plating on the back side of the tube. The degree of correction required to restore the bridge network to balance is an indication of the capacitance of the measuring capacitor and, thus, it is a function of the quantity of fuel in the fuel tank.

Other objects and advantages will become apparent from a further study of the specification and drawings, in which—

FIG. 1 is a schematic diagram illustrating the magnetohydrodynamic principle utilized in a vertical scale indicator capacitor;

FIG. 2 is a schematic diagram illustrating the magneto-hydrodynamic rebalancing capacitance feedback loop utilized in the capacitance sensing bridge network circuit for measuring fuel quantity in a container; and FIG. 3 is a schematic diagram illustrating another embodiment of the magneto-hydrodynamic rebalancing capacitance indicator utilized in the circuit shown in FIG. 2.

Referring now to FIG. 1, there is shown a magneto-hydrodynamic system for controlling the movement of a conductive fluid, such as mercury or some such other suitable fluid conductor. A reservoir 2 partially filled with mercury 4 is connected to a conduit 6 of dielectric material which forms at one end thereof a vertical tube 8 having its upper end sealed. Suitable magnets 10 are placed adjacent the conduit 6 to provide a magnetic field transverse to the longitudinal axis of the conduit. Conductors 12 are placed on the conduit 6 and make contact with the conductive fluid 4 and a suitable current source 14 is fed to the conducting portions 12, as shown.

According to the arrangement shown in FIG. 1, a charge particle $q$ moving perpendicular to a magnetic field $\vec{B}$ with a velocity $v$ will experience a force F:

$$\vec{F} = qv\vec{B}$$

If $\vec{v}$ and $\vec{B}$ are at right angles and $l$ is the length of the conducting path through the magnetic field, then:

$$\vec{F} = \vec{II} \times \vec{B}$$

According to the arrangement shown in FIG. 1, the conducting liquid 4 is caused to rise in the tube 6 by reason of the force F exerted thereon. The height $h$ of the liquid 4 in the tube 6 is a function of several variables; two of these variables are controlled, that is, $\vec{B}$ and $\vec{I}$, and together they act as a pumping means for moving the conducting liquid; however, the remaining variables are uncontrolled, some of which are the density of the conducting liquid 4, acceleration forces, temperature, etc. It is desirable, therefore, to reduce the uncontrolled variables to an insignificant level, and this can be achieved by incorporating the system into a feedback loop.

As shown in FIG. 2, the principles described in FIG. 1 are utilized in a capacitive feedback loop incorporated in a capacitive sensing rebalancing bridge network circuit. An alternating voltage of suitable frequency, for example, 400 cycles, is supplied by a source 16 to a transformer 18. The secondary winding 20 of transformer 18 is grounded at its center tap 22. One side of the secondary winding 20 is connected to an electrode 24 of a measuring capacitor transducer 26. The other electrode 28 of capacitor 26 is conductively connected in series with an input terminal junction 30 of a phase sensitive detector-bridge amplifier 32. The other side of the secondary winding 20 is connected to a rebalancing capacitance indicator system generally referred to as 34 and which, in turn, is also connected to the terminal junction 30 of the bridge amplifier 32.

As shown in FIG. 2, the rebalancing capacitance indicator system according to this invention includes a reservoir 36 containing a liquid conductor 38 which is supplied to a suitable transparent conduit 40 of dielectric material such as glass or the like. A $\vec{B} \times \vec{I}$ dielec- 42, such as described in FIG. 1, and which is commonly known as a magneto-hydrodynamic pump acts on the liquid 38 to position the same in the vertical capacitance portion 44 of the conduit 40. As shown, the capacitor element 44 comprises a laminated structure 46 composed of a front face plate 48 of high impedance material with a grounded shield plate 50 positioned on the back side thereof. The conduit 40 is coiled around the plate structure 46 with capacitance being formed between the conductive liquid electrode 38 and the front face plate electrode 48. The rebalance capacitance is proportional only to the amount of conductive liquid 38 opposite the front plate 48. The plate 48 along with the individual helices of the conduit 40 may be scaled according to a suitable convention for the use in aircraft fuel gauging. With conduit 40 helically wound around the plate structure 46, a high resolution in desired grid readout on the face plate 48 may be obtained. For example, as shown, the variable capacitance feedback is proportional to grid quantity readout 64. The capacitor 44 is then connected from the plate electrode 48 to the junction terminal 30. The output of the amplifier 32 is fed to a variable conduction angle SCR bi-directional D.C. power drive 52 which, in turn, controls the current source in the $\vec{B} \times \vec{I}$ pump 42.

As understood in the art, the measuring capacitor 26, including the spaced electrodes 24, 28, is positioned in a suitable tank 54 whereby the liquid or fuel fills the space between the electrodes to an extent depending on its tank level. The capacitance of the measuring condensor depends upon the height of the dielectric fuel or liquid between the electrodes and its dielectric constant. In an aircraft measuring system the fuel has a dielectric constant of approximately 2 and air has a dielectric constant of 1, hence, if the entire height of the space between the electrodes is filled with fuel, the capacitance of the condenser 26 will be approximately twice its empty tank value. As fuel is consumed, its height between the electrode drops and air enters into the top space between the electrodes thus causing the capacitance of the condenser 26 to decrease accordingly. Consequently, measuring capacitor 26 may be employed in the bridge circuit to reflect the quantity of fuel in the aircraft fuel tank. To accomplish this measuring capacitor 26 is designed to follow a predetermined capacitance length law of curves so characterized that the capacitance of condenser 26 is proportionately related to the volume of fuel in the tank 54, and such that incremental changes of capacitance is proportionally related to incremental changes of fuel volume and thus the quantity of fuel in the tank.

The operation of the system according to this invention is as follows. The signal E at the junction 30 from the measuring bridge network is fed to the amplifier 32, this signal being essentially the resultant of current through the liquid measuring capacitor 26 summed with the current through the variable rebalancing capacitor 44 in the lower portion of the secondary winding 20.

Since the current through the measuring capacitor 26 is of opposite phase with respect to the current through the rebalancing capacitor 44, the resultant input signal E to amplifier 32 will be substantially zero when the measuring bridge is balanced. If, after the bridge is balanced, the capacitance of measuring capacitor 26 changes in response to a change in fuel quantity in the tank 54, the bridge will no longer balance and a current signal E will be applied to amplifier 32. The unbalanced input signal applied to amplifier 32 will be either in phase or 180° out of phase with respect to the source 16, depending entirely on whether the capacitance of measuring capacitor 26 decreases or increases in comparison to the capacitance of the rebalancing capacitor 44.

The amplified signal from amplifier 32 is applied as a feedback to the variable conduction angle SCR bi-directional D.C. power drive 52 which, in turn, drives the $\vec{B} \times \vec{I}$ pump 42 which moves the conducting liquid 38 thus changing the capacitance signal output of capacitor 44 until a null is reached at the amplifier input. The height of the conductive fluid 38 in the conduit 40 will then indicate with high resolution the quantity of liquid being measured in the tank 54.

In FIG. 3 there is an embodiment of the rebalancing capacitor 44, wherein in accordance with the showing of FIG. 1, the conduit 40' is provided with a conductive coating or plate 56 mounted on the back half thereof. The variable capacitance is then between the conducting liquid 38 and the plate 56. On the front of the conduit 40' there is provided a suitable scale for indicating the top of the conductive fluid within the conduit. The operation of the variable feedback capacitor shown in FIG. 3 is the same as that described for the embodiment shown in FIG. 2.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

We claim:
1. In a capacitance-type dielectric liquid contents gauge, the combination comprising, a supply transformer having a primary winding and a secondary winding having an intermediate tap, a rebalancing bridge network including a liquid contents measuring capacitor having one electrode connected to said secondary winding on one side of said tap and the other electrode connected to a junction terminal, a rebalancing capacitor including a conduit means, a conductive liquid electrode positioned in said conduit means, means electrically coupled to said secondary winding on the other side of said tap, a fixed electrode means positioned on said conduit and connected to said junction terminal, a signal responsive means connected to said junction terminal, and a magneto-hydrodynamic pump means responsive to the output of said signal responsive means for moving said conductive liquid electrode within said conduit means for varying the reference signal furnished by said rebalancing capacitor wherein the resultant input signal to said signal responsive means is reduced substantially to zero.

References Cited

UNITED STATES PATENTS 2,500,348  3/1950  DeGiers et al. _____ 73—313
3,212,077  10/1965  Edward _____ 73—398

S. CLEMENT SWISHER, Primary Examiner

PO-1050
(5/69)

UNITED STATES PATENT OFFICE
CERTIFICATE OF CORRECTION

Patent No. 3,478,587  Dated November 18, 1969

Inventor(s) David J. Philipps and David A. Lamphere

It is certified that error appears in the above-identified patent and that said Letters Patent are hereby corrected as shown below:

In col. 3, line 11, "dielec-" should read --pump--

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents